United States Patent [19]
Deutsch et al.

[11] Patent Number: 5,119,683
[45] Date of Patent: Jun. 9, 1992

[54] SOLENOID CONTROLLER WITH FLYBACK PULSES USEFUL FOR DIAGNOSTICS AND/OR CONTROL

[75] Inventors: Robert W. Deutsch, Sugar Grove; James W. Kopec, St. Charles, both of Ill.

[73] Assignee: Motorola, Inc., Schaumburg, Ill.

[21] Appl. No.: 578,378

[22] Filed: Sep. 7, 1990

[51] Int. Cl.⁵ .............................................. G01F 1/00
[52] U.S. Cl. .................................................... 73/861
[58] Field of Search ...... 73/118.2, 861, 861.74–861.76, 73/198, 119 A, 861

[56] References Cited

U.S. PATENT DOCUMENTS 4,932,246  6/1990  Deutsch et al. .................. 73/119 A

OTHER PUBLICATIONS

Deutsch, "Injector Fault Testing Methods" Motorola Technical Developments, vol. 3, Mar. 1983.

Johnson, "Process Control Instrumentation Technology", pp. 22–23, 1977.

Primary Examiner—Robert Raevis
Attorney, Agent, or Firm—John H. Moore

[57] ABSTRACT

Measurement of fluid flow (or other fluid parameter) through a solenoid-actuated valve (12), and/or measurement of nominal operation of the valve itself, is achieved in one embodiment by modifying the amplitude of flyback pulses (48) generated by the solenoid. The degree of modification preferably varies with the value of the sensed information, and the modified flyback pulses are processed to extract that information from diagnostic and/or control purposes. In another embodiment, a variable impedance is established in the path of the solenoid's recirculation current. For a fraction of the solenoid's recirculation period, the impedance is caused to vary as a function of the value of the sensed information. For the remainder of the recirculation period, the value of the impedance is greatly reduced to maintain the recirculating current at a relatively high level.

17 Claims, 2 Drawing Sheets

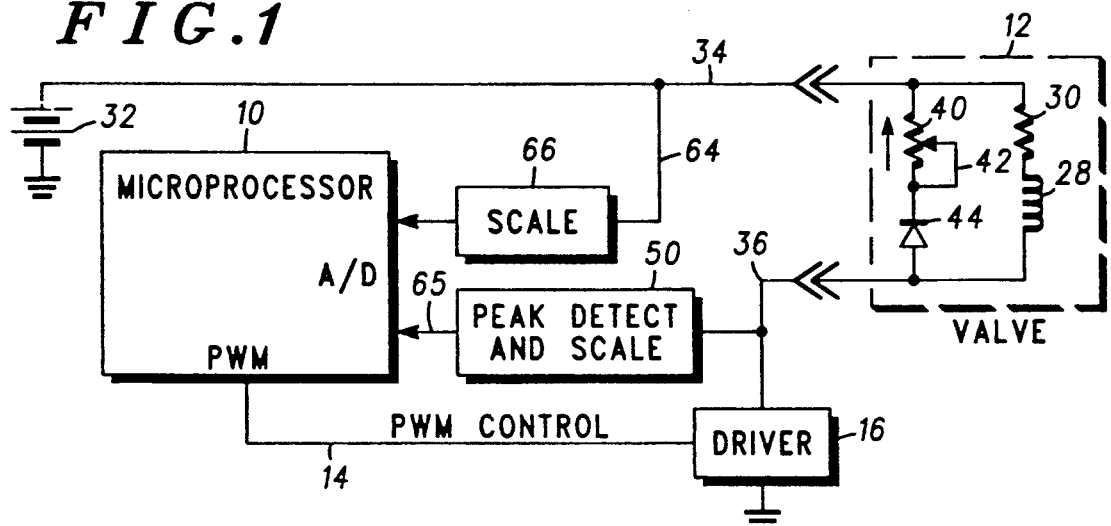
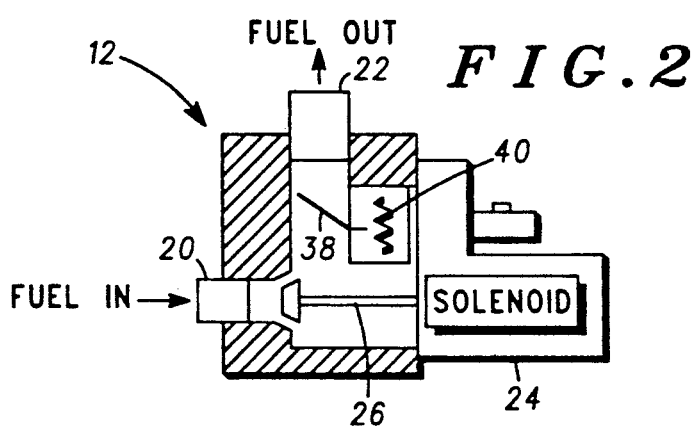
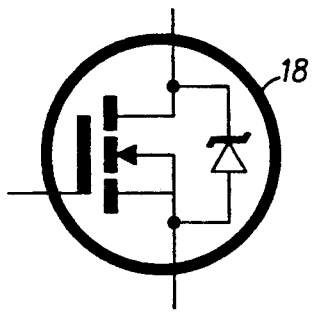
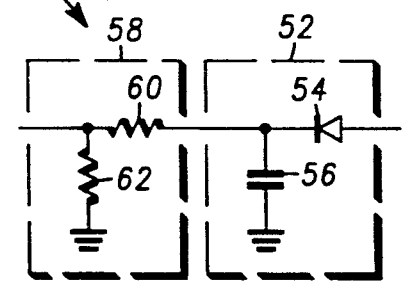
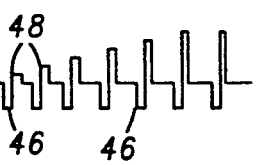
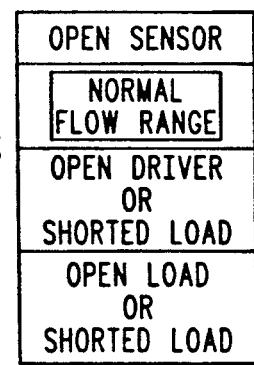
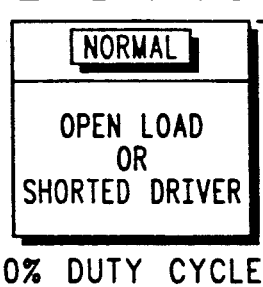
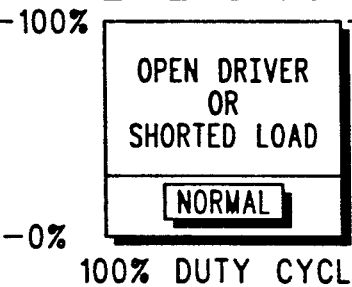
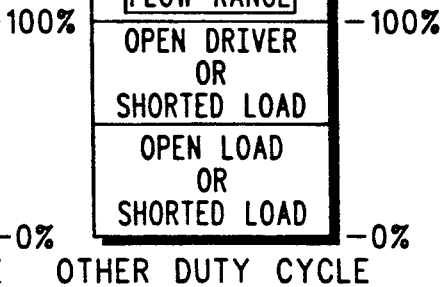

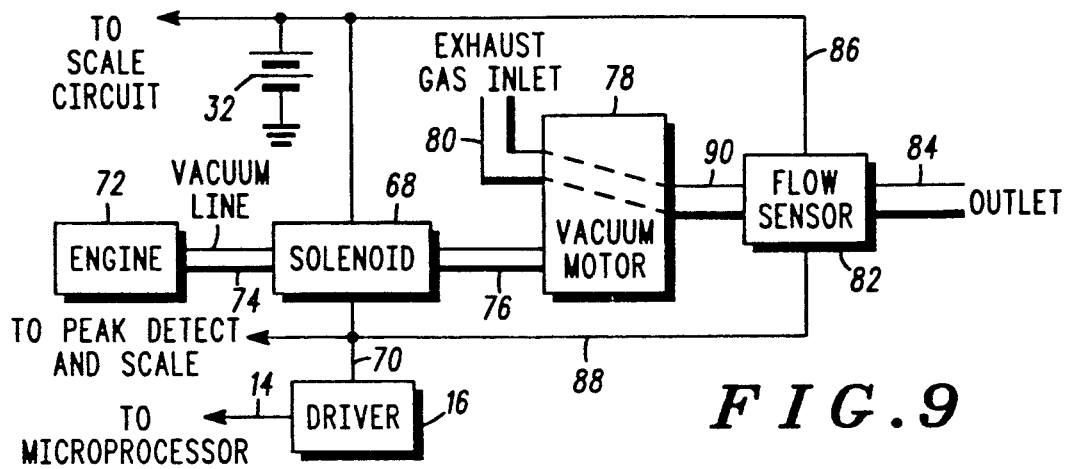
FIG. 9
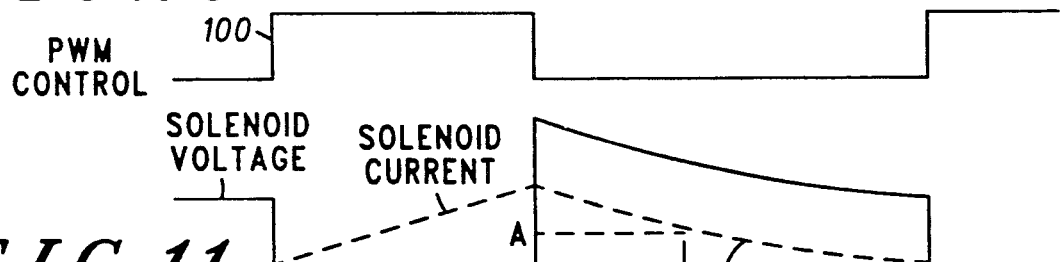
FIG. 10
FIG. 11
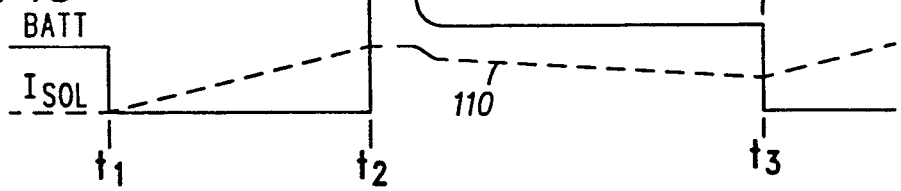
FIG. 12
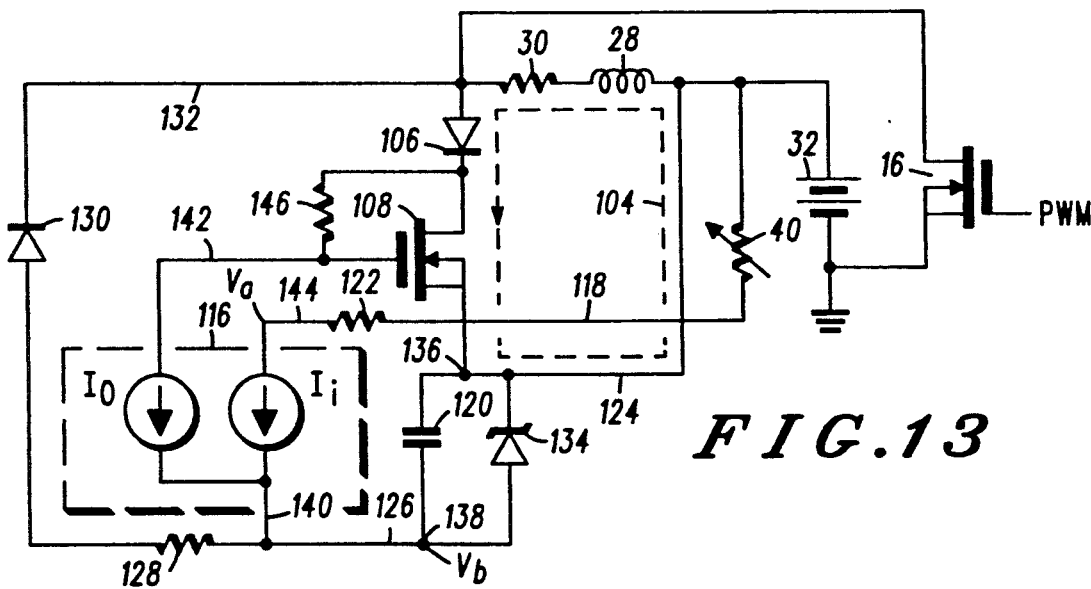
FIG. 13

5,119,683

SOLENOID CONTROLLER WITH FLYBACK PULSES USEFUL FOR DIAGNOSTICS AND/OR CONTROL

FIELD OF THE INVENTION

This invention is generally directed to the field of solemoin-actuated devices and their electronic controllers. A valve that is used to control the flow fluid is an example of a solenoid-actuated device for which the invention is particularly well suited.

BACKGROUND OF THE INVENTION

In an application wherein a solenoid-actuated valve is used to control the flow of a fluid (e.g., coolant, fuel vapor, exhaust gas, gasoline), it is frequently desirable to be able to monitor one or more parameters of the fluid. In some applications, fluid flow is the parameter which needs to be monitored, while in other applications fluid pressure or fluid temperature are parameters whose values need to be monitored. In any case, information concerning the measured parameter needs to be developed economically and reliably, and that information needs to be fed back to monitoring/control circuitry.

It is also desirable to be able to monitor the operation of the valve itself. If the solenoid which actuates the valve is shorted, open, or otherwise malfunctioning, that information also needs to be sent back to the monitoring/control circuitry.

In the past, testing and/or monitoring the operation of solenoid-actuated valves has typically required the use of additional electronic circuitry which can raise system costs to an unacceptable level. Further, the inclusion of such testing and/or monitoring circuitry has resulted in the use of additional electrical conductors to carry information between the monitored valve and the monitoring/control circuitry.

OBJECTS OF THE INVENTION

It is a general object of the invention to provide an improved method and apparatus for reliably and economically sensing a measurable parameter of a fluid in a system having a solenoid-actuated device, and/or for sensing the operation of the solenoid-actuated device itself.

It is a more specific object of the invention to provide such a method and apparatus wherein minimal extra circuitry is required, and no additional electrical conductors are required to send information back from the monitored fluid or device.

BRIEF DESCRIPTION OF THE FIGURES

FIG. 1 is a schematic diagram of an fluid control system which includes a specific implementation of the invention;

FIG. 2 is a more detailed view of the valve that is schematically shown in FIG. 1;

FIG. 3 shows more detail of the solid state solenoid driver illustrated in FIG. 1;

FIG. 4 is a schematic diagram of a preferred form of the peak detector and scaler shown in FIG. 1;

FIGS. 5A and 5B show waveforms that are generated by the system shown in FIG. 1;

FIGS. 6, 7 and 8 are schematic representations of diagnostic results achieved by the invention as implemented in FIG. 1;

FIG. 9 illustrates an alternate embodiment of the invention.

FIGS. 10 and 11 depict waveforms useful in explaining the operation of the embodiment shown in FIG. 1;

FIG. 12 shows waveforms developed by the embodiment shown in FIG. 13; and

FIG. 13 shows an additional embodiment of the invention.

DESCRIPTION OF THE PREFERRED EMBODIMENT

FIG. 1 illustrates a solenoid controlled system in which a conventional microprocessor 10 controls the operation of a valve 12 for controlling the flow of fluid. The fluid may be, for example, engine coolant, gasoline vapor contained in an under-hood storage canister, exhaust gas in an automotive EGR system, gasoline fuel, or any other fluid having a parameter whose value needs to be measured.

In its conventional mode of operation, the microprocessor 10 sends pulse width modulated (PWM) control signals via a lead 14 to a driver 16 so as to turn the driver off and on and thereby actuate and deactuate a solenoid within the valve 12, thereby to regulate the flow of fluid. FIG. 3 illustrates a type of field effect transistor 18 that may be used for the driver 16.

Referring briefly to FIG. 2, various mechanical aspects of the valve 12 are shown. This illustrated valve includes a fluid inlet port 20, a fluid outlet port 22, a solenoid 24 that is actuated by the driver 16, and a spring loaded pintle 26 (the spring is not shown) which opens and closes the fluid inlet port 20 in response to actuation and deactuation of the solenoid 24.

Referring back to FIG. 1, the solenoid 24 is shown schematically as including a coil 28 in series with a resistance 30. Power to the solenoid is, in this application, received from a battery 32 that couples to the solenoid via a conductor 34, and another conductor 36 that couples the driver 16 to the coil 28. With this arrangement, actuation of the driver 16 essentially couples the conductor 36 to ground so that a current path is set up from the battery 32 through the solenoid (resistance 30 and the coil 28) and through the driver 16 to ground.

The arrangement as thus far described is conventional. According to the present invention, the illustrated system is modified by including means for measuring a selected parameter of the fluid that is controlled by the valve, and for modifying flyback pulses generated by the solenoid so that the modified flyback pulses contain information representing the value of the measured parameter. The modified flyback pulses are then received by sensing or detecting circuitry which is able to sense the measured parameter of the fluid from the information contained in the modified flyback pulses. This technique also permits the operation of the valve itself to be monitored for malfunctions, as will be more fully described below.

The parameter which is measured by the embodiment shown in FIG. 1 is fluid flow. Toward this end, the valve 12 includes a vane 38 (FIG. 2) that is situated within the valve and in the path of fluid flow so that the vane 38 moves in proportion to the flow of fluid through the valve. Coupled to the vane 38 is a variable resistance 40 such that physical movement of the vane 38 moves a wiper arm 42 of the resistance 40 and thereby varies the resistance thereof. Thus, the value of the resistance 40 is essentially proportional to the position of the vane 38 and, therefore, proportional to the rate of fluid flow through the valve 12. As shown in FIG. 1, the resistance 40 is coupled in series with a diode 44 and the series combination of these two elements is coupled in parallel with the solenoid elements 28 and 30.

It is well understood that a solenoid such as that shown herein generates a flyback pulse each time it is de-energized. As will now be described, this invention uses and modifies those flyback pulses to achieve the above-stated objects of the invention.

In the illustrated embodiment, the flyback pulses generated by the solenoid 24 are modified in accordance with the measured parameter (i.e. fluid flow) so that the modified flyback pulses may be sensed for that information content. Based on that information, the microprocessor 10 may control the valve differently, or it may use that information for diagnostic purposes as discussed in more detail below. One of the features of the present invention is that no additional wiring between the valve 12 and the illustrated control circuitry (i.e. driver 16) is needed in order to monitor the operation of the valve or the measured parameter of the fluid. This beneficial result arises from the fact that illustrated configuration permits the solenoid to receive its energizing pulses via the electrical conductor 36, and that same conductor 36 carries modified flyback pulses back to sensing and/or detecting circuitry which extract the information contained in the modified flyback pulses.

Referring now to FIG. 5B, the illustrated waveform includes a succession of negative going pulses 46, each of which represent a turn-on pulse generated by the driver 16 for turning on the solenoid 24. Following each pulse 46 is a flyback pulse 48 which is generated, as known, by the collapsing magnetic field associated with the de-energized solenoid. In this embodiment, an increase in fluid flow through the valve results in a movement of the vane 38 so as to increase the value of the resistance 40. This results in a corresponding increase in the amplitude of the flyback pulses 48 which appear on the conductor 36. Thus, the flyback pulses 48 are amplitude modulated so as to carry the information concerning the parameter which is being measured. In this case, a large amplitude flyback pulse represents a relatively large flow of fluid through the valve, whereas a smaller amplitude flyback pulse represents a relatively smaller flow of fluid through the valve. (It should be noted that the rate of amplitude change shown in FIG. 5B may actually occur over many more cycles of flyback pulses than are illustrated).

To sense and use the information contained in the amplitude-modulated flyback pulses, the illustrated embodiment includes a peak detect and scale circuit 50. Essentially, this circuit 50 converts the signal shown in wave form 5B to a voltage that is scaled to a useful range so as to provide an analog feedback signal that can be used for control and/or diagnostic purposes. An example of how the circuit 50 may be implemented is shown in FIG. 4 to which reference is now briefly made.

The circuit 50 is shown as including a conventional peak detector 52 comprising a diode 54 and a capacitor 56. Coupled to the output of the peak detector is a scaling circuit 58 which is a simple resistive divider comprising resistors 60 and 62. The operation of the peak detect and scale circuit 58 is such that the positive going flyback pulses are peak detected by the peak detector portion 52, and the peak detector signal is then scaled down by the voltage divider comprising resistors 60 and 62 to form a signal such as shown in FIG. 5A. This signal is then fed to a conventional analog-to-digital (A/D) converter within the microprocessor 10 where it will be compared against a reference signal to determine whether the valve is operating properly and/or to monitor the fluid parameter which is being measured.

Preferably, the reference against which the signal shown in FIG. 5A is compared is derived from the battery 32. For this purpose, the battery 32 is coupled via a conductor 64 to another scaling circuit 66 which may be another simple resistive voltage divider such as that shown in FIG. 4. The output of the scaling circuit 66 is then also fed to an analog-to-digital converter within the microprocessor 10 wherein the amplitude of the scaled battery voltage is compared to the amplitude of the scaled and peak detected signal that is generated at the output (lead 65) of the peak detect and scale circuitry 50.

Referring now to FIGS. 6, 7 and 8, these Figures illustrate in a schematic way how the microprocessor can be programmed to determine whether the measured parameter is within a normal range and/or whether the solenoid and/or other components of the system are operating properly, based on a comparison of the scaled battery voltage against signal on lead 65. Since the present embodiment uses a pulse-width modulated signal to energize the driver and solenoid, the results of the comparison will depend on the value of the duty cycle associated with the control signal on the lead 14. Thus, three conditions are shown in FIGS. 6, 7 and 8. FIG. 6 shows the results of the comparison in the situation where the signal on the lead 14 has a zero percent duty cycle; FIG. 7 represents the situation where the signal on the lead 14 has a 100% duty cycle; and FIG. 8 represents the situation where the signal on lead 14 has other duty cycles, i.e. not zero or 100%. It should also be noted that the vertical axes in FIGS. 6 through 8 represent a percentage of the scaled battery voltage.

Referring more specifically to FIG. 6, when the signal on the lead 14 has a zero percent duty cycle, i.e., the driver is intended to be off, the microprocessor will determine that the system is operating normally if a comparison between the scaled battery voltage and the signal on lead 65 (FIG. 5A) indicates that the signal on lead 65 is at or near 100% of the scaled battery voltage. Anything much less than that indicates that either the driver 16 is shorted or that the solenoid itself is open.

Referring now to FIG. 7, when the signal on lead 14 has a 100% duty cycle, the results of the above mentioned comparison should reveal that the signal on lead 65 (waveform 5A) is at or near zero percent of the scaled battery voltage because in this situation the driver 16 will be on continuously and the conductor 36 will be essentially grounded through the driver. If the results of the comparison reveal that the signal on lead 65 exceeds that normal percentage of scaled battery voltage, then it may be assumed that either the driver 16 is open or that the solenoid itself is shorted to the battery 32.

When the system is operating somewhere between zero percentage duty cycle and 100% duty cycle, then the results shown in FIG. 8 apply. Under these circumstances, if the value of the waveform shown in FIG. 5A is equal to zero or a very small percentage of the battery voltage, then it may be assumed that either the solenoid itself is open or that the driver 16 is shorted. A value higher than that and up to 100% of battery voltage would indicate that the driver 16 is open or that the solenoid is shorted. If the results of that comparison indicate a value just above 100% of the scaled battery voltage, then the assumption can be made that the fluid is flowing through the valve in a nominal range; if the comparison reveals that the value of the signal 5A is even higher than that, then it must be assumed that the flow sensor itself, i.e. the vane 38 and/or the resistance 40 is inoperative. In FIG. 8 this is referred to as the "open sensor" condition.

Referring now to FIG. 9, an embodiment of the invention is shown wherein the solenoid does not directly control the fluid which is being sensed, but the sensed information is nevertheless used to modify the solenoid's flyback pulses. In this embodiment, a solenoid 68, which is energized by the driver 16 via a lead 70, is coupled to an automotive engine 72 via a vacuum line 74. An outlet line 76 from the solenoid is coupled to a vacuum motor 78. The vacuum motor 78 has an exhaust gas inlet 80 and an exhaust gas outlet 90 which is coupled through a flow sensor 82 to an outlet 84. As shown, the driver 16 is coupled to the microprocessor just as shown in FIG. 1. The line 70 connects to the peak detect and scale circuit 50 shown in FIG. 1, and the battery 32 is connected to the scale circuit 66 shown in FIG. 1.

With this arrangement, the solenoid 68 controls the vacuum in the line 76 in response to actuation by the driver 16. The vacuum in the line 76, in turn, adjusts the operation of the vacuum motor 78 in a conventional manner to vary the amount of exhaust gas going through the flow sensor 82 to the outlet 84.

The flow sensor 82 may include a vane in the path of fluid flow and a variable resistance which is adjusted by movement of the vane, as shown by the vane 38 and the resistance 40 (FIGS. 1 and 2). The variable resistance is coupled in parallel with the solenoid 68 by leads 86 and 88. Accordingly, the amplitude of the flyback pulses generated by the solenoid 68 will be modified by the variable resistance in the flow sensor 82, and the modified flyback are processed exactly as described above in connection with FIGS. 1-8.

It can be seen, therefore, that this invention allows measurement of a fluid parameter (e.g., normal or abnormal flow), in addition to measurement of the operation of the solenoid that controls the fluid. This is accomplished with relatively inexpensive and reliable circuitry. Moreover, no additional electrical conductors are required between the driver and the solenoid (this is particularly important in automotive applications).

The invention, as described in connection with the embodiments already discussed, is primarily useful in on-off pulsed control systems in which solenoid current decreases to zero during each cycle of operation. But the invention may also be used in applications having up to, but not including, a 100% duty cycle for the driver 16, even though the solenoid current may not have time to decay completely to zero.

In certain applications, it is desirable to ensure the solenoid current remains above a minimum value during the entire cycle of operation. One such application is a system in which it is necessary to control the average flow of fluid in proportion to the duty cycle of the driver 16. In such a system (e.g., an EGR control valve) the flow of fluid is continuous and proportional to the average value of the solenoid current (referred to herein as continuous flow systems). To appreciate the applicability of another aspect of this invention to continuous flow systems, the discussion below will first explain in more detail how the solenoid current of the FIG. 1 embodiment decays.

Referring to FIGS. 10 and 11, FIG. 10 shows an expanded view of the PWM control signal that is applied to the driver 16, and FIG. 11 shows a similarly expanded view of the solenoid current and voltage that is developed in the embodiment of FIG. 1. When the pulse 100 (FIG. 10) begins at time $t_1$, the driver 16 (FIG. 1) is turned on to couple the solenoid to ground and thereby to actuate it for controlling the flow of fluid. Such actuation of the valve causes the solenoid current to increase as shown in FIG. 11 between times $t_1$ and $t_2$ until, when the pulse 100 terminates at time $t_2$, the solenoid current begins decreasing as shown in FIG. 11.

Depending on the values of the resistances 30 and 40, the drive frequency, and the value of the solenoid current, it is possible that, under certain circumstances, the solenoid's recirculating current (shown in FIG. 11 between the times $t_2$ and $t_3$) may decline sufficiently to permit the solenoid to drop out. For example, at time $T_a$ in FIG. 11 the recirculating current drops below a level A which is the minimum level of current required to cause the solenoid to hold-in. In on-off type control systems, solenoid drop out is not a real problem because the solenoid is designed to drop out at a certain point. However, in continuous flow systems, it is generally desirable for the solenoid to hold-in for the entire cycle of operation.

In accordance with another aspect of this invention, and to meet the needs of continuous flow systems, the recirculating current is maintained at a level above level A throughout the entire recirculation period (defined herein as the period between $t_2$ and $t_3$), irrespective of the values of resistances 30 and 40, the driver frequency, and other parameters.

A solenoid controller constructed in accordance with this additional aspect of the invention is identical to the controller as shown in FIG. 1 except that, instead of situating the diode 44 and the sense resistance 40 in parallel with the solenoid (coil 28 and resistance 30), the sense resistance 40 and diode 44 are repositioned and coupled with the additional circuitry shown in FIG. 13 in order to insure that the solenoid does not drop out under any circumstances. In FIGS. 1, 2, 12 and 13, components that serve the same function have the same reference numeral.

The drive circuitry shown in FIG. 13 for energizing the solenoid is essentially the same as that shown in FIG. 1. It specifically includes the driver 16 which may be an FET (field effect transistor) which receives the pulse width modulated control signal from the microprocessor 12, just as shown in FIG. 1. When the driver 16 is energized by the pulse 100 shown in FIG. 10, it connects the solenoid (resistance 30 and coil 28) in series between ground and the battery 32. Just as was described with reference to FIG. 1, the solenoid remains energized for the period between times $t_1$ and $t_2$, with turn-off occurring at time $t_2$, at which time a flyback pulse 102 (FIG. 12) is generated. A recirculating current, developed during the recirculation period (time $t_2$ to $t_3$), is maintained at a relatively high level throughout the entire recirculation period to eliminate the possibility of solenoid drop-out.

As shown in FIG. 13, the solenoid has a recirculation path that is identified by a dotted line 104. This recirculation path includes a recirculating diode 106 and a variable impedance shown as an FET 108, the combination of which is coupled in parallel with the solenoid. Note that the sense resistance 40 is outside the recirculation path in this embodiment. According to the invention, there is established, in the solenoid's recirculation path 104, for a limited predetermined time period that is a fraction of the recirculation period, an impedance (such as effected by the FET 108) whose value varies as a function of the value of the parameter which is to be measured by the solenoid controller. After the predetermined time period, the value of the variable impedance is reduced for the remaining duration of the recirculation period, thereby to maintain the recirculating current at a level high enough to ensure that the solenoid remains actuated throughout the entire recirculation period.

Referring again to FIG. 12, note that the level of the recirculating current (dashed line 110) stays at a relatively high level during the recirculation period (time $t_2$ to $t_3$), in contrast to the lower level which the recirculating current may drop to as shown in FIG. 11.

Referring again to FIG. 12, the predetermined time period during which the variable impedance (such as FET 108) in the recirculation path is permitted to vary is shown as period $t_f$. During the period $t_f$, the resistance of the FET 108 is caused to change in accordance with, and in response to, changes in the value of the sense resistance 40. This change in the impedance of the FET 108 changes the amplitude of the flyback pulse 102 generated by the solenoid so that the amplitude of the flyback pulse is modified to contain information relating to the parameter to be measured. The effect thus developed is similar to that developed by the FIG. 1 construction which also alters the amplitude of the flyback pulse in accordance with the measured parameter. In the embodiment of FIG. 13, however, the impedance effected by the FET 108 is greatly reduced after the period of $t_f$ and is held at a greatly reduced value for the remaining duration of the recirculation period. This is accomplished essentially by operating the FET 108 in its linear mode and allowing its resistance to vary in accordance with variations in the sense resistance 40 during the period $t_f$, and then, during the remainder of the recirculation period, operating the transistor in a saturated mode so that its impedance is greatly diminished.

To accomplish the foregoing, the embodiment shown in FIG. 13 includes biasing circuitry which includes a current mirror 116 which is coupled to the sense resistance 40 via a lead 118, and to the FET 108. The biasing circuitry is responsive to variations in the value of the sense resistance 40 for turning the FET 108 on at a relatively low but variable level of conduction so as to present, in the recirculating path 104, a relatively high impedance whose value varies in response to variations in the value of the sense resistance during the period $t_f$. Also included is timing circuitry, including a capacitor 120 and a resistor 122, for terminating the FET's relatively low level of conduction after the predetermined time period $t_f$, so that the biasing circuitry then drives the FET into a relatively higher level of conduction during the remainder of the recirculation period. This causes the recirculating current to remain at a relatively high level throughout the recirculation period.

As shown, the current mirror 116 (which is of conventional construction and may be, for example, an integrated circuit manufactured by Texas Instruments, Inc. and designated as TLO14A) has an input current $I_i$ and an output current $I_o$, wherein $I_o$ is preferably larger than $I_i$ by a predetermined factor. For example, the value of the current $I_o$ may be four times the value of the input current $I_i$.

In operation, $I_i$ (and thus $I_o$ also) is permitted to vary in accordance with variations in the value of the sense resistance 40 during the period $t_f$, thereby to vary the bias on the FET 108 to allow it to conduct at a level which also varies in accordance with the value of the sense resistance 40. When the period $t_f$ terminates, the value of $I_i$ is abruptly decreased by operation of the timing circuitry so that the value of $I_o$ decreases proportionally and permits the FET 108 to saturate for the remainder of the recirculation period. The way in which this is accomplished will now be described in more detail.

One side of the capacitor 120 is coupled via a lead 124 to one terminal of the battery 32. The other side of the capacitor 120 is coupled via a lead 126 to a resistance 128 which controls the discharge time constant associated with the capacitor 120. The resistance 128 is coupled in series with a diode 130 whose cathode is coupled to the battery 20 via a lead 132, solenoid resistance 30 and inductance 28.

A 5 volt zener diode 134 is coupled across the capacitor 120 at nodes 136 and 138. The node 138 is coupled to the output port of the current mirror via a lead 140. The input branches of the current mirror 116 are coupled via a lead 142 to the gate of the FET 108, and to the battery 32 via a lead 144, resistance 122, and sense resistance 40. With this arrangement, a voltage $V_a$ is developed on the lead 144, a voltage $V_b$ is developed at the node 138, and a voltage $V_c$ is developed across the capacitor 120.

Operation is as follows. When the driver 16 is turned on at time $t_1$ (see FIGS. 10 and 12), the cathode of the diode 130 becomes grounded through the lead 132 and the driver 16. This discharges the capacitor 120 through the resistance 128, thereby causing the voltage $V_b$ to drop until the zener diode 134 conducts and clamps $V_c$ to 5 volts.

At time $t_2$, the driver 16 turns off, thereby removing the discharge path for the capacitor 120 and allowing the voltage $V_b$ to increase. At this time, the current $I_i$ begins flowing and has a magnitude as shown by Equation A below:

$$\text{Equation A:} \quad I_i = \frac{V_c - V_a}{R_{122} + R_{sense}}$$

where $R_{122}$ is the value of resistance 122 and $R_{sense}$ is the value of the sense resistance 40. Thus, the current $I_i$ is proportional to the sense resistance 40. Since the current $I_o$ is proportional to the current $I_i$, the current $I_o$ is also proportional to the value of the sense resistance 40.

The current $I_o$ now flows through the lead 142 and a resistance 146 that is connected between the drain and gate of the FET 108. Consequently, a voltage drop is developed across the resistance 146 that biases FET 108 into conduction in a linear mode such that the level of current conducted by FET 108 varies in proportion to the value of the current $I_o$. As a result, the impedance presented by the FET 108 to the recirculation current flowing in the path 104 varies in inverse proportion to the magnitude of the current $I_o$ and, therefore, in inverse proportion to the value of the sense resistance 40. This effect continues for the period $t_f$ (see FIG. 12) so that the magnitude of the flyback pulse 102 varies in accordance with variations in the value of the sense resistance 40. The remainder of the controller as shown in FIG. 1 (microprocessor 12, etc.) processes the modified flyback pulse to extract the information concerning the value of the sense resistance.

Referring again to FIG. 13, it can be seen that the voltage $V_b$ starts increasing at time $t_2$ because its discharge path has been opened by the de-activation of the driver 16. Consequently, the currents $I_i$ and $I_o$ begin to decrease. At the end of the period $t_f$, the voltage $V_b$ will have risen to a value at or near the value of the battery 32 voltage, thereby completely shutting off $I_i$ and $I_o$. The gate-to-source voltage of the FET 108 remains at its threshold value, but the absence of the current $I_o$, and its corresponding voltage drop across the resistance 146, causes the drain-to-gate voltage of the FET 108 to drop to zero. This results in the FET going into saturation. Consequently, the impedance which the FET 108 presents to the recirculating current is greatly reduced. This condition continues for the remaining duration of the recirculation period, i.e., until time $t_3$, when a new cycle of operation begins. The much lower impedance presented by the FET 108 results in much lower energy dissipation in the recirculation path, thereby causing the recirculation current to remain at a relatively high level as shown in FIG. 12. Because the recirculation current does not drop below the level A (see FIG. 11), the potential for solenoid drop-out is eliminated.

It can be seen, therefore, that the embodiment shown in FIG. 13 provides an improved technique for monitoring the operation of a solenoid, or a parameter of the fluid that is controlled by the solenoid, so that the solenoid does not drop out during the recirculating period, even under adverse conditions. Further, this technique is not limited to use with a sense resistance. Other types of variable components may be used to sense the parameter to be measured. In any case, solenoid drop-out will be avoided a shown herein by maintaining the recirculating current above the level required to maintain the actuation of the solenoid.

Although the invention has been described in terms of a preferred embodiment, it will obvious to those skilled in the art that many alterations and modifications may be made without departing from invention. For example, instead of using a vane and a variable resistance to detect fluid flow, an on-off type sensor could be used to merely sense the presence or absence of fluid flow. Alternately, fluid pressure or temperature could be measured and used to modify the flyback pulses. Various other types of alternatives will be obvious to those skilled in the art. Accordingly, it is intended that all such alterations and modifications be considered as within the spirit and scope of the invention as defined by the appended claims.

What is claimed is:

1. In a system having a controlled flow of fluid with a measurable parameter, having a solenoid, and having a solenoid driver that responds to an energizing signal, and wherein the solenoid generates a flyback pulse each time the energizing signal terminates, the improvement comprising:

means for measuring the measurable parameter of the fluid and for modifying the flyback pulses such that the modified flyback pulses contain information representing the measured value of the parameter; and means receiving the modified flyback pulses and sensing the information contained therein.

2. The improvement as set forth in claim 1 wherein said means for measuring and modifying causes the flyback pulses to be amplitude modulated.

3. The improvement as set forth in claim 2 wherein the amplitude modulation is substantially proportional to the sensed value of the measured parameter.

4. The improvement as set forth in claim 2 wherein said means for measuring and modifying includes a moveable vane for measuring fluid flow.

5. The improvement as set forth in claim 4 wherein said means for measuring and modifying includes a resistance which varies in response to movement of the vane, and wherein the resistance is coupled in circuit with the solenoid so as to modify the amplitude of the flyback pulses.

6. The improvement as set forth in claim 1, further including a driver for developing energizing signals for the solenoid, an electrical conductor coupling the energizing signals from the driver to the solenoid, the same electrical conductor also carrying the flyback pulses from the solenoid, and wherein said means receiving the modified flyback pulses receives the pulses from the same electrical conductor.

7. The improvement as set forth in claim 1 wherein said means for sensing the information in the modified flyback pulses includes means for peak detecting the flyback pulses, means for scaling the peak detected flyback pulses and means for comparing the scaled signal to a reference signal.

8. The improvement as set forth in claim 7 wherein the solenoid is powered by voltage from a battery, and wherein the means for sensing the information further includes means for scaling the battery voltage, and wherein the scaled battery voltage constitutes the reference signal.

9. A system as set forth in claim 1 wherein the solenoid generates a recirculation current that flows in a recirculation path during a predetermined recirculation period, and further including:

a variable impedance in the recirculation path;

means for causing the impedance to vary as a function of the measured value of the parameter for a limited, predetermined time period that is a fraction of the recirculation period, and for reducing the value of the impedance for the remaining duration of the recirculation period.

10. A control/diagnostic system, comprising:

a valve including a solenoid for controlling the flow of fluid in response to energizing signals, the solenoid generating a flyback pulse each time the energizing signal terminates;

a measuring device situated in the valve for monitoring the flow of fluid;

a variable resistance coupled to the measuring device so that the value of the resistance varies in response to variations measured by the measuring device, the resistance being coupled in circuit with the solenoid so as to modify the amplitude of the flyback pulse as the value of the resistance changes; and means for sensing the amplitude of the modified flyback pulses and for comparing the sensed amplitude to a reference signal to permit detection of an abnormal condition when the comparison varies from a nominal value.

11. A system as set forth in claim 10 wherein said measuring device comprises a moveable vane.

12. A system as set forth in claim 10 further including:
a driver for generating the energizing signal;
a single electrical conductor coupling the energizing signals from the driver to the solenoid, the single electrical conductor also carrying the modified flyback pulses from the solenoid;
and wherein the sensing and comparing means receives the modified flyback pulses from the single electrical conductor.

13. A system as set forth in claim 10 wherein the solenoid is powered by battery voltage, wherein the means for sensing and comparing includes a peak detector receiving the modified flyback pulses and a resistive scaler receiving the output of the peak detector, and further including means for scaling the battery voltage to provide the reference signal.

14. In a solenoid-controlled system wherein fluid flow is regulated by a solenoid which generates flyback pulses when the solenoid is de-energized, a method of determining whether the system is operating properly, comprising:
sensing the fluid flow;
modifying a characteristic of the flyback pulses to reflect the value of the fluid flow;
comparing the modified flyback pulses to a reference; and
determining whether the system is operating properly based on the results of the comparison.

15. A method as set forth in claim 14 wherein the solenoid generates a recirculation current that flows in a recirculation path during a predetermined recirculation period, and further comprising:
establishing a variable impedance in the solenoid's recirculation path, and, for a limited, predetermined time period that is a fraction of the recirculation period, causing the impedance to vary as a function of the fluid flow; and
after the predetermined time period, reducing the value of said impedance for the remaining duration of the recirculation period, thereby to maintain the recirculating current at a level high enough to insure that the solenoid remains actuated throughout the entire recirculation period.

16. A method as set forth in claim 14 further including coupling energizing signals to the solenoid by an single electrical conductor such that the same electrical conductor carries the flyback pulses.

17. A method as set forth in claim 14 wherein the step of modifying a characteristic of the flyback pulses includes disposing a variable resistance in circuit with the solenoid and varying the value of the resistance as a function of the fluid flow to thereby vary the amplitude of the flyback pulses.

* * * * *